(No Model.)
W. S. WORLEY.
ROAD SCRAPER AND LEVELER.
No. 330,764. Patented Nov. 17, 1885.
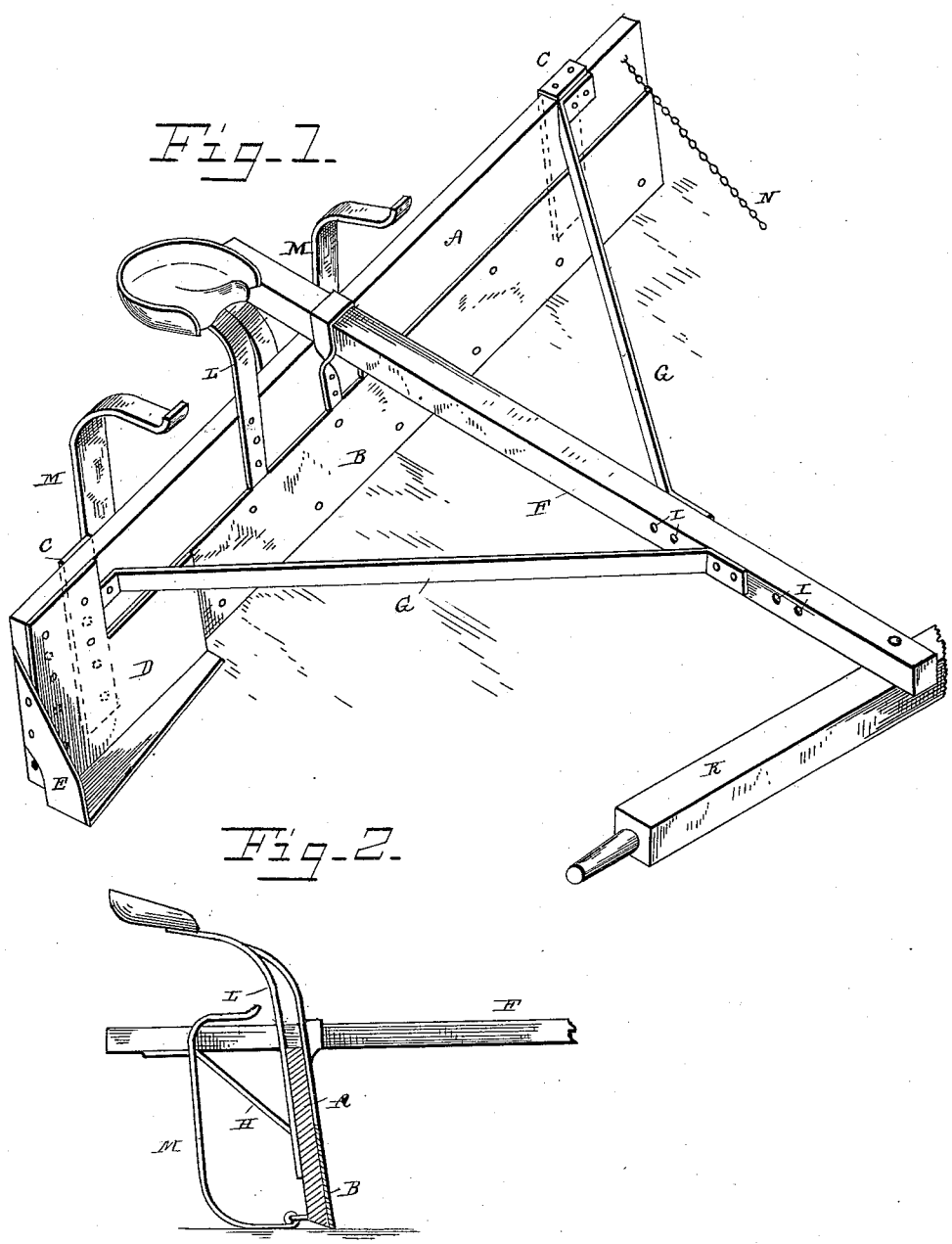
WITNESSES
Edwin L. Jewell.
J. J. McCarthy.
INVENTOR
William S. Worley
By C. M. Alexander
ATTORNEY

UNITED STATES PATENT OFFICE.

WILLIAM S. WORLEY, OF HINESBOROUGH, ILLINOIS.

ROAD SCRAPER AND LEVELER.

SPECIFICATION forming part of Letters Patent No. 330,764, dated November 17, 1885.

Application filed June 18, 1884. Serial No. 135,294. (No model.)

*To all whom it may concern:*

Be it known that I, WILLIAM S. WORLEY, a citizen of the United States, residing at Hinesborough, in the county of Douglas and State of Illinois, have invented certain new and useful Improvements in Road Scrapers and Levelers, of which the following is a specification, reference being had therein to the accompanying drawings.

My invention relates to improvements in road scrapers and levelers, and is designed, objectively, to provide a scraper that shall be strong and efficient in leveling rough or new roads, cutting down the hillocks, and filling the hollows and ruts, one that shall clean out the ditches on each side the road and shall be easily raised from the ground for transportation from place to place.

In the annexed drawings, illustrating the device, Figure 1 represents a perspective of the scraper and leveler, and Fig. 2 a section through the same.

A is the leveler-board, made of heavy stout timber, and carrying on its lower or scraping edge a metallic knife, B, firmly bolted thereto. At proper points on the board are braces C, placed across the said board to prevent splitting or cracking the same from the strain. At one end of the board and bolted thereto is a ditching-scoop, D, having a side continuation, E, which also acts as a brace.

By means of additional bolt-holes in the scraper-board the scoop may be adjusted as to its depth of cut.

Secured to about the center of the upper edge of the leveler-board is a tongue, F, so placed as to bring the leveler-board at an oblique angle to the line of draft, the loose earth traveling from the ditcher-scoop toward the other end. The tongue is secured by two side braces, G, and a rear brace, H, also fitting loosely in a socket secured to the leveler-board. The tongue is also provided with holes I, so that it may be adjusted at different angles. To the forward end of the tongue is secured a truck, the axle K being shown. The scraper has a seat secured to it by a divided standard, L, which acts as a spring and as an additional brace for the board. Placed on one or both sides of the seat is a lever or levers, M, one end pivoted to the lower edge of the leveler-board and the other end curved upward and forward, so that the driver with his foot may press it to the rear and then bring his weight to bear on it. The curve of the lever is such that the backward motion will raise the pivoted end and thus elevate the scraper or leveler. The seat being somewhat to one side of the center the lever connected to the longer side will tend to raise the leveler, the driver acting as a balancing-weight; but it is preferable to use both, giving thereby two points of support and a consequent even motion when the device is moved from place to place. The driver may walk behind and operate the lever by hand. The truck in front takes the strain from the horses and thus enables them to pull better and with more ease. A chain, N, is connected to the outer end of the leveler-board and prevents its sagging by being secured to the axle in front.

Having described the device, what I claim is—

1. A road-scraper having a draft-pole provided with a series of holes and braced on each side, and also passing through a socket on the scraper or leveler board and projecting to the rear, where it is also braced, substantially as and for the purpose specified.

2. A road-scraper having a seat, the standard supporting the same being divided and passing on each side the scraper-board to brace it.

3. A road-scraper having a lever pivoted to the lower side of the leveler-board, said lever rounding upward to the rear, so that when forced backward it will raise the said scraper from the ground.

4. A road scraper and leveler having an adjustable tongue secured to and supported by a truck, a ditcher scoop secured adjustably to one end, a spring-seat with a divided bracing-standard and an elevating lever or levers pivoted to the lower part of a scraper, the said scraper being braced, and having secured to its lower edge a metallic scraping-knife, and having a chain connecting one end of the scraper with the axle to prevent sagging.

In testimony whereof I affix my signature in presence of two witnesses.

WILLIAM S. WORLEY.

Witnesses:
T. SIMPSON,
D. J. SWINFORD.